United States Patent
Kim et al.

(10) Patent No.: US 8,574,760 B2
(45) Date of Patent: Nov. 5, 2013

(54) SAFETY-ENHANCED ELECTROCHEMICAL DEVICE INCLUDING ELECTRODE CONTAINING BINDER AND WAX

(75) Inventors: Je Young Kim, Goyang-si (KR); Pil Kyu Park, Daejeon (KR); Soon Ho Ahn, Daejeon (KR); Yong Tae Lee, Jeonju-si (KR)

(73) Assignee: LG Chem, Ltd., Seoul (KR)

( * ) Notice: Subject to any disclaimer, the term of this patent is extended or adjusted under 35 U.S.C. 154(b) by 170 days.

(21) Appl. No.: 12/087,709

(22) PCT Filed: Jan. 3, 2007

(86) PCT No.: PCT/KR2007/000016
§ 371 (c)(1),
(2), (4) Date: Jul. 11, 2008

(87) PCT Pub. No.: WO2007/094562
PCT Pub. Date: Aug. 23, 2007

(65) Prior Publication Data
US 2009/0023064 A1    Jan. 22, 2009

(30) Foreign Application Priority Data
Jan. 3, 2006    (KR) .................. 10-2006-0000401

(51) Int. Cl.
*H01M 4/02*    (2006.01)
*H01M 4/13*    (2010.01)
*H01M 4/60*    (2006.01)
*H01M 4/62*    (2006.01)

(52) U.S. Cl.
USPC ............ 429/217; 429/209; 429/212; 429/232

(58) Field of Classification Search
USPC .................... 429/209, 212, 217, 232
See application file for complete search history.

(56) References Cited

U.S. PATENT DOCUMENTS

| | | | |
|---|---|---|---|
| 5,798,189 A | 8/1998 | Hayashida et al. | |
| 6,153,332 A | 11/2000 | Nishida et al. | |
| 6,162,264 A * | 12/2000 | Miyazaki et al. | ............ 29/623.5 |

(Continued)

FOREIGN PATENT DOCUMENTS

| CN | 1503997 A | 6/2004 |
|---|---|---|
| JP | 07-161348 | 6/1995 |
| JP | 10-050348 | 2/1998 |
| JP | 10-064549 | 3/1998 |
| JP | 10-241665 | 9/1998 |
| KR | 10-2004-0013415 | 2/2004 |

OTHER PUBLICATIONS

Eastman, Product Data Sheet RegalrezTM 1085 Hydrocarbon Resin, Nov. 8, 2012.*

(Continued)

*Primary Examiner* — Sean P Cullen
(74) *Attorney, Agent, or Firm* — Birch, Stewart, Kolasch & Birch, LLP

(57) ABSTRACT

The present invention relates to an electrode comprising electrode active material particles, conductive particles, a binder and wax, wherein the electrode active material particles are interconnected by a network of the conductive particles, and the paths of the conductive particles interconnecting the electrode active materials are partially or entirely fixed by the wax. Furthermore, the present invention provides an electrochemical device comprising the electrode.

By use of wax having a low meting viscosity in order to partially or entirely fix the paths of the conductive particles, which interconnect the spaced electrode active material particles, the present invention can improve processability and safety of the electrochemical device.

11 Claims, 2 Drawing Sheets

(56) References Cited

U.S. PATENT DOCUMENTS

| | | |
|---|---|---|
| 6,248,475 B1 | 6/2001 | Hayashida et al. |
| 6,315,801 B1 | 11/2001 | Miyazaki et al. |
| 2005/0079422 A1 | 4/2005 | Ko et al. |
| 2007/0141463 A1* | 6/2007 | Stevanovic .................. 429/217 |
| 2007/0196717 A1 | 8/2007 | Kuroki et al. |

OTHER PUBLICATIONS

International Search Report for PCT/KR2007/000016, Apr. 6, 2007.
Written Opinion for PCT/KR2007/000016, Apr. 6, 2007.

* cited by examiner

SAFETY-ENHANCED ELECTROCHEMICAL DEVICE INCLUDING ELECTRODE CONTAINING BINDER AND WAX

TECHNICAL FIELD

The present invention relates to an electrode containing electrode active material particles, conductive particles, a binder and wax, a method for manufacturing the electrode, and an electrochemical device using the electrode.

BACKGROUND ART

Recently, an interest in energy storage technology has increased. In particular, applications of electrochemical devices have extended to mobile phones, camcorders, laptop computers, PCs and electric vehicles, and thereby efforts and attempts to research and develop such electrochemical devices are increasingly being actualized. In this respect, the field of electrochemical devices has occupied a great deal of attention, and in particular, a lot of interest has been focused on the development of rechargeable secondary batteries. Among currently used secondary batteries, lithium ion secondary batteries, which were developed in early 1990's, have been spotlighted because they have higher operation voltage and energy density than those of conventional batteries, which use aqueous solution electrolytes, such as Ni-MH batteries, Ni—Cd batteries and $PbSO_4$ batteries.

However, the lithium ion secondary battery may swell, or at the worst explore or ignite, by reacting an electrode active material with an electrolyte when the temperature of the battery in the state of full charge increases due to environmental changes such as external impacts caused by pressure, nails, a nipper, etc., an ambient temperature increase, overcharge, etc.

In particular, a cathode active material is sensitive to voltage. Therefore, as the battery is charged thereby increasing voltage, the reactivity of the cathode and the electrolyte increases so that the surface of the cathode is dissolved, resulting in oxidation of the electrolyte. Accordingly, the possibility of ignition or explosion increases.

"High-temperature overcharge" is hazardous occurrence that may cause the lithium ion battery to be in the worst state. For example, if the lithium ion battery is overcharged at more than 4.2V, the electrolyte starts to be dissolved, and if the temperature increases to the ignition point, the possibility of ignition increases.

This safety problem should be solved because batteries, in particular non-aqueous electrolyte secondary batteries such as lithium ion secondary batteries, are designed to have high capacity and energy density.

DISCLOSURE OF THE INVENTION

The object of the present invention is to provide an electrochemical device wherein safety is enhanced by interrupting current by virtue of electric resistance, which increases promptly in response to an increase of temperature in the device.

The present invention provides an electrode comprising electrode active material particles, conductive particles, a binder and wax, wherein the electrode active material particles are interconnected by a network of the conductive particles and the paths of the conductive particles interconnecting the electrode active materials are partially or entirely fixed by the wax, and an electrochemical device comprising the electrode.

In addition, the present invention provides a method of manufacturing an electrochemical device comprising the steps of:

(a) preparing slurry wherein (i) electrode active material particles, (ii) conductive particles, (iii) a binder and (iv) wax are dispersed in a solvent;

(b) applying the slurry onto a current collector and drying and pressing the slurry to provide an electrode; and (c) assembling an electrochemical device comprising the electrode obtained from (b) and injecting an non-aqueous electrolyte into the device.

Hereinafter, the present invention will be described in more detail.

Wax is an oligomer, which easily melts and has excessively low melting viscosity, unlike a polymer having high viscosity. Such wax is an unctuous solid having slidability and plasticity and has a low molecular weight ranging from 500 to 10,000.

The present invention is characterized in that spaced electrode active material particles are interconnected to one another by a network of conductive particles, and paths of the conductive particles interconnecting the electrode active materials are partially or entirely fixed by wax (see FIG. 1).

The conductive particles, which are interconnected to one another, interconnect the spaced electrode active materials while functioning as a passageway for electronic conduction.

The electrochemical device having the aforementioned characteristics can improve safety in the device (see FIGS. 3 and 5). Specifically, if the temperature in the electrochemical device exceeds the melting temperature of the wax due to overcharge, etc., the wax melts and flows throughout pores formed in the electrode. As a result, the conductive particles, which were fixed by the wax, are disconnected from one another (see FIG. 1) thereby increasing the resistance in the electrode so as to interrupt the flow of current. Accordingly, the temperature in the device no longer increases.

For example, when the battery is overcharged, the temperature in the battery increases. As a result, the wax in the electrode melts thereby increasing the electrode resistance such that the overcharge is immediately ceased so as to prevent explosion and ignition of the battery.

At this time, the wax, which is an oligomer having an excessively low melting viscosity when compared to a polymer, has excellent mobility when melting. Accordingly, the wax can be promptly dispersed when it melts, and effectively disconnect the conductive particles in the electrode. Due to the short response time to the increase of temperature in the electrochemical device, a significant effect can be obtained in achieving the safety in the device.

The melting viscosity of the wax is preferably 10-1,000 mPa·s, more preferably 400 mPa·s. or less. In addition, it is preferable that the wax has the above-described melting viscosity when the temperature in the device increases to the extent that the current is to be interrupted.

If the melting viscosity is less than 10 mPa·s., the wax has an excessively low molecular weight so that the network of the conductive particles cannot effectively be disconnected. In this case, a significant improvement in safety cannot be achieved. If the melting viscosity is more than 1,000 mPa·s., the high viscosity results in degradation of fluidity so that the network of the conductive particles cannot rapidly be disconnected.

The molecular weight of the wax is preferably 10,000 or less. A greater molecular weight causes an increase of viscosity, etc. while degrading fluidity so that the speed for responding to an electrode resistance increase caused by a temperature increase is reduced. The lower limit value for the molecular weight of the wax can be determined by the lower limit value for the melting viscosity as mentioned above.

PVdF, which is generally used as a binder in an electrode, has a melting point of 175° C. On the other hand, the wax has a melting point of 80 to 130° C., which is an appropriate range for achieving the safety in electrochemical devices such as batteries, against a temperature increase.

The wax is preferably polyolefin-based wax. Polyolefin-based wax does not cause any reaction in a battery because it lacks a functional group.

The example of polyolefin-based wax is polyethylene wax, polyprophylene wax, etc.

The particle size of the wax is preferably 20 μm or less. Excessively large particle size causes problems in dispersing the wax, and further causes scratch upon the electrode coating.

Preferably, the wax is used in an amount of 0.1 wt. % to 10 wt. % in the electrode (except for the mass of the current collector). If the wax is used in an excessively small amount, it cannot perform its proper function. If the wax is used in an excessively large amount, problems occur in the capacity and battery performance.

Non-limiting examples of the conductive particles include acetylene blacks or carbon blacks. The amount of the conductive particles, which are used in the electrode, is 0.5 to 10 wt. % if the electrode is a cathode, and less than 10 wt. % if the electrode is an anode.

The present invention may be applied to each of or both a cathode and an anode, and is more effective particularly in lithium secondary batteries among electrochemical devices.

In general, a lithium secondary battery comprises a cathode capable of absorbing and discharging lithium ions, an anode capable of absorbing and discharging lithium ions, non-aqueous electrolyte, and a separation membrane.

As a cathode active material to construct the cathode, a lithium composite oxide is used. According to non-limiting examples, the lithium composite oxide contains, as a principal component, a lithium intercalation material such as a lithiated magnesium oxide, a lithiated cobalt oxide, a lithiated nickel oxide or a composite oxide obtained by combinations of the above oxides.

Then, the cathode active material is bonded to the cathode current collector, for example a foil made of aluminum, nickel or combinations thereof, so as to construct the cathode. The amount of the cathode active material is preferably 80 to 99 wt. %.

An anode active material to construct the anode contains as a principal component a lithium intercalation material such as lithium metal, lithium alloy, carbon, petroleum coke, activated carbon, graphite, or various types of carbons, etc. The anode active material is bonded to an anode current collector, for example foil made of copper, gold, nickel or a copper alloy, or combinations thereof, so as to construct the anode. The amount of the anode active material is preferably 80 to 99 wt. %.

Non-limiting examples of the binder used in the present invention are preferably at least one selected from a group consisting of polytetrafluoroethylene, polyvinylidene fluoride, polyvinyl fluoride, poly-acrylonitrile, nitrile rubber, polybutadiene, polystyrene, styrene butadiene rubber, polysulfide rubber, butyl rubber, hydro-styrene-butadiene rubber, nitro cellulose and carboxymethylcellulose. The amount of the binder is preferably 0.1 to 15 wt. %.

The separation membrane may have micro-porous structure, and may be polyethylene, polyprobylene or a multilayer film prepared by combinations thereof, or a polymer film for solid polymer electrolytes or gel-type polymer electrolytes, such as polyvinylidene fluoride, polyethylene oxide, polyacrylonitrile or polyvinylidene fluoride hexafluoropropylene copolymer.

The electrolyte may contain a salt having the structure of $A^+B^-$, wherein $A^+$ includes alkali metal cations such as $Li^+$, $Na^+$ and $K^+$ or combinations thereof, and $B^-$ includes anions such as $PF_6^-$, $BF_4^-$, $Cl^-$, $Br^-$, $I^-$, $ClO_4^-$, $ASF_6^-$, $CH_3CO_2^-$, $CF_3SO_3^-$, $N(CF_3SO_2)_2^-$ and $C(CF_2SO_2)_3^-$, or combinations thereof. Specifically, the electrolyte means that the lithium salt is dissolved or dissociated in an organic solvent such as propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone ([gamma]-butyrolactone) or mixtures thereof.

The method of manufacturing the electrochemical device according to the present invention comprises the steps of: (a) preparing slurry wherein (i) electrode active material particles, (ii) conductive particles, (iii) a binder and (iv) wax are dispersed in a solvent; (b) applying the slurry onto a current collector and drying and pressing the slurry to provide an electrode; and (c) assembling an electrochemical device comprising the electrode obtained from (b) and injecting a non-aqueous electrolyte into the device.

There is no particular limitation to the solvent used in the slurry. In general, N-methyl-2-pyrrolidone (NMP) may be used for both an anode and a cathode. Distilled water can be used for an aqueous anode.

The wax dispersed in a solvent can be injected in powder form, which is in the state between solid and liquid.

When thoroughly dispersed by mixing upon manufacturing the electrode, the conductive particles are arranged to interconnect the spaced electrode active material particles, after the electrode is coated.

If necessary, heat-treatment may be performed in order to vaporize the solvent when manufacturing the electrode.

On the other hand, the particle size significantly affects the mixing and coating processes in light of dispersibility. Wax having a low melting viscosity is effective in improving dispersibility upon drying the electrode. Accordingly, if wax having a small particle size and a low melting viscosity is used, the processability can be improved.

MODE FOR CARRYING OUT THE INVENTION

Hereinafter, the present invention will be described more specifically with reference to examples. It is understood that the following examples merely refer to examples of the present invention, and the present invention is not limited thereto.

Example 1

Manufacture of Coin Cell

In order to prepare slurry, lithium cobalt oxide: carbon black as conductive particles: polyvinylidene fluoride: and polyethylene wax were dispersed in N-methyl-2-pyrrolidone (NMP) in the weight percent ratio of 93:3:2:2, respectively. The slurry was coated on aluminum foil, and dried at 150° C. and pressed to form a cathode. The thickness of the coating on the pressed cathode was 70 μm, except for the aluminum foil. The polyethylene wax, which was used as an electrode resistance binder, has a particle size of 10 μm, a melting point of 90° C. and melting viscosity of 140 mPa·s or less. For an anode, lithium metal was used. A250 of Cell Guard was used as a separation membrane. EC/EMC (1:2) (based on weight percents) liquid electrolyte containing the concentration of 1M $LiPF_6$ was used as an electrolyte to provide a coin cell.

Comparative Example 1

Example 1 was repeated to provide a coin cell, except that the slurry was manufactured by use of lithium cobalt oxide: carbon black as conductive agents: and polyvinylidene fluoride in the weight percent ratio of 94:3:3, respectively.

(Evaluation)

Figure 1:
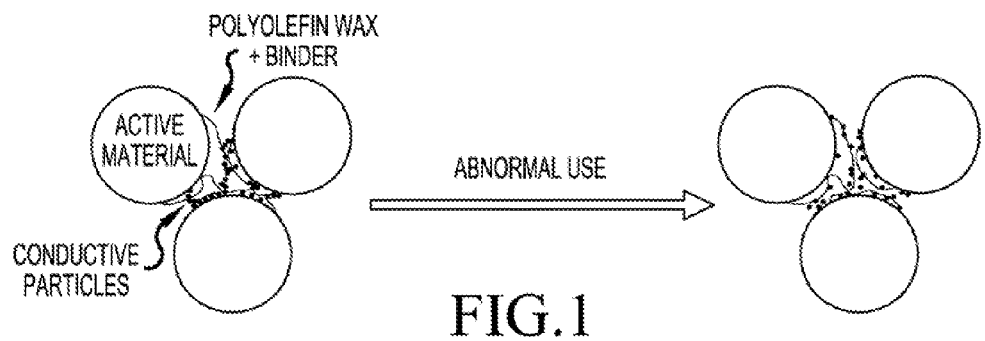
FIG. 1 is a schematic view illustrating the relationship among the electrode active material particles, the conductive particles, the binder and the wax in the electrode according to the present invention.
Figure 2:
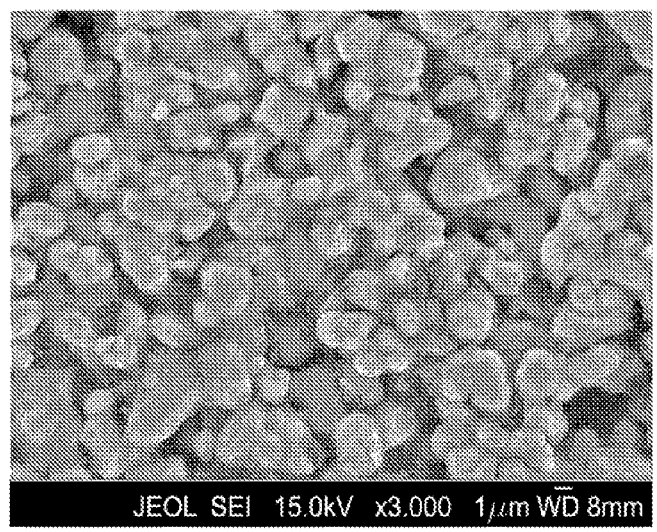
FIG. 2 is a photographic view of the electrode containing the wax according to Example 1, taken by a Scanning Electron Microscope.
Figure 3:
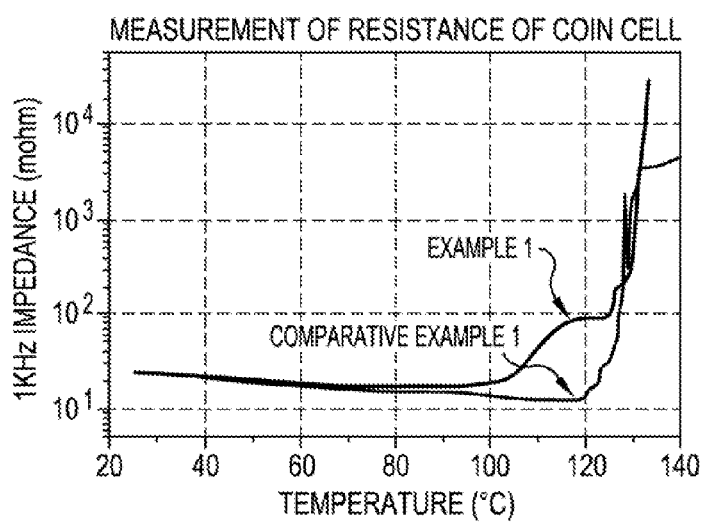
FIG. 3 is a graph showing the variation of resistance in each battery obtained from Example 1 and Comparative Example 1 at the temperature ranging from 100° C. to 120° C.
Figure 4:
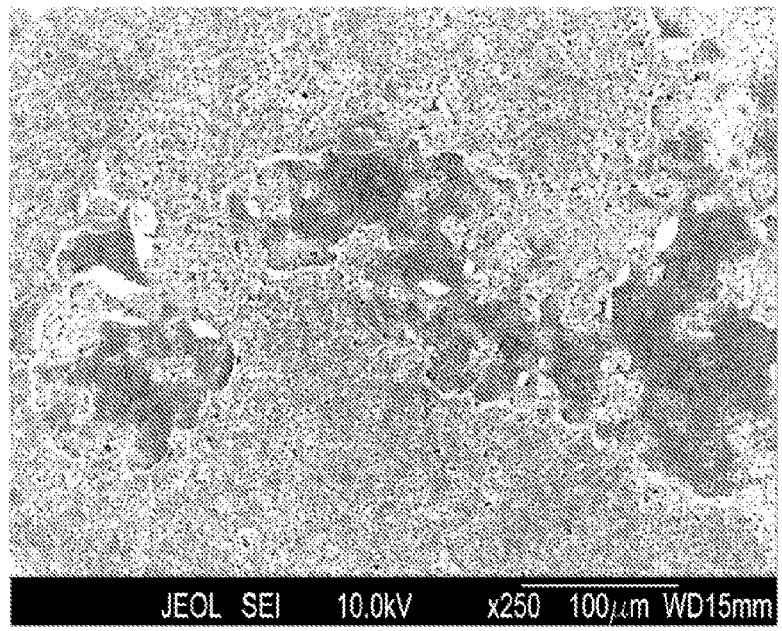
FIG. 4 is a photographic view showing the electrode obtained from Example 1 wherein the wax was melted when the temperature increased to 150° C., taken by a Scanning Electron Microscope.

The graph in FIG. 3 shows the variation of resistance when the surface temperature in each battery manufactured according to Example 1 and Comparative Example 1 increases from room temperature to 140° C. For Example 1, the resistance started to increase at 95° C. and significantly increased around 105° C. to be 5 or more times the initial resistance around 120° C. The resistance of the battery increased up to 100 or more times around 130° C. because pores of the separation membrane were clogged due to the shut down of the separation membrane. For Comparative Example 1 relating to a normal battery, the resistance continued to decrease until the temperature increases to 120° C., and increased 100 or more times around 130° C. due to the shut-down of the separation membrane.

Example 2

Manufacture of Full Cell

A cathode was manufactured by use of the same composition ratio as adopted for manufacturing the coin cell according to Example 1. In addition, an anode was manufactured by anode slurry, which was obtained by use of artificial graphite: a conductive agent: and polyvinylidene fluoride in the weight percent ratio of 93:1:6, respectively. A250 of Cell Guard was used as a separation membrane. An EC/EMC (1:2) (based on weight percents) liquid electrolyte containing the concentration of 1M $LiPF_6$ was injected, and a general stack and folding method was used to manufacture a full cell of ICP383562 (capacity: 800 mAh).

Comparative Example 2

A cathode was manufactured by use of the same composition ratio as adopted for manufacturing the coin cell according to Comparative Example 1. The other processes for manufacturing a full cell of ICP 383562 (800 mAh) were the same as those used in Example 2.

(Evaluation)

Figure 5:
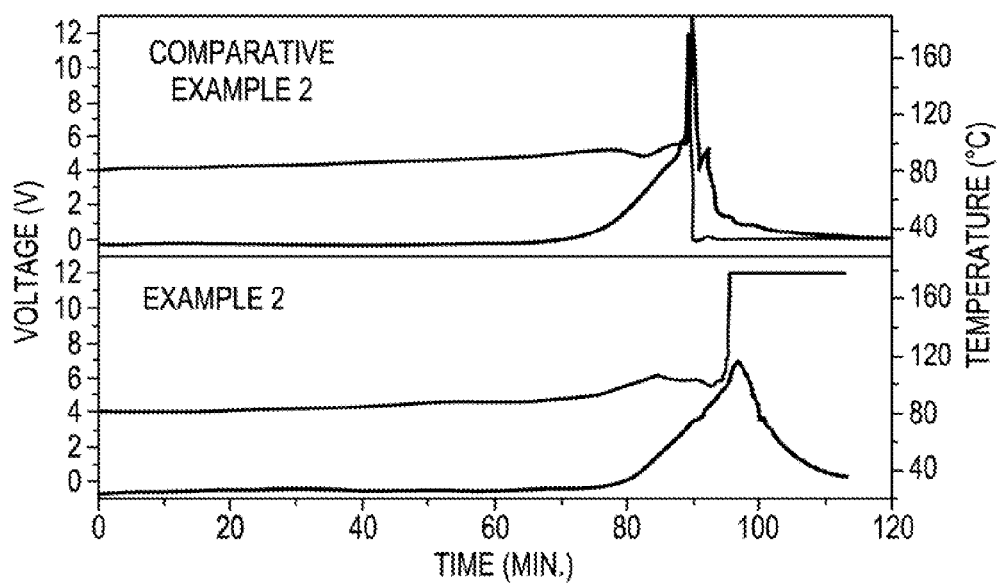
FIG. 5 is a graph showing the variation of temperature and voltage in each full cell obtained from Example 2 and Comparative Example 2 during overcharge testing at 12V/1C.

FIG. 5 shows the variation of the temperature and voltage when overcharging up to 12V/1C the cells manufactured according to Example 2 and Comparative Example 2. As shown in FIG. 5, the cell according to Comparative Example 2 ignited and explored when it was overcharged. However, the cell containing polyolefin wax according to Example 2 was safe without undergoing ignition and explosion although the surface temperature increases up to around 120° C.

Industrial Applicability

The present invention can improve processability and safety of an electrochemical device by use of wax having a low melting viscosity in order to partially or entirely fix paths of conductive particles, which interconnect spaced electrode active material particles.

The invention claimed is:

1. An electrode comprising electrode active material particles, conductive particles, a binder and wax,
   wherein the electrode active material particles are interconnected by a network of the conductive particles, and the paths of the conductive particles interconnecting the electrode active materials are partially or entirely fixed by the wax,
   wherein the wax is a polyolefin-based wax, a melting viscosity of the wax ranges from 10 to 400 mPa.s, and a melting point of the wax ranges from 80 to 130° C.

2. The electrode as claimed in claim 1, wherein the particle size of the wax is 20 μm or less.

3. The electrode as claimed in claim 1, wherein the molecular weight of the wax is 10,000 or less.

4. The electrode as claimed in claim 1, wherein the wax is used in an amount of 0.1 wt. % to 10 wt. % in the electrode except for the mass of the current collector.

5. An electrochemical device comprising a cathode, an anode and an electrolyte,
   wherein the cathode, the anode or both the cathode and anode is the electrode set forth in claim 1.

6. The electrochemical device as claimed in claim 5, wherein when the temperature in the electrochemical device exceeds the melting temperature of the wax, the wax melts and flows so that the conductive particles, which are fixed by the wax, are disconnected.

7. The electrochemical device as claimed in claim 5, wherein the electrochemical device is a lithium secondary battery.

8. The electrochemical device as claimed in claim 5, wherein the particle size of the wax is 20 μm or less.

9. The electrochemical device as claimed in claim 5, wherein the molecular weight of the wax is 10,000 or less.

10. The electrochemical device as claimed in claim 5, wherein the wax is used in an amount of 0.1 wt. % to 10 wt. % in the electrode except for the mass of the current collector.

11. A method of manufacturing an electrochemical device set forth in claim 5 comprising the steps of:
    (a) preparing a slurry wherein (i) electrode active material particles, (ii) conductive particles, (iii) a binder, and (iv) wax are dispersed in a solvent;
    (b) applying the slurry onto a current collector and drying and pressing the slurry to provide an electrode; and
    (c) assembling an electrochemical device comprising the electrode obtained from (b) and injecting a non-aqueous electrolyte into the device.

* * * * *